(12) United States Patent
Norton

(10) Patent No.: US 12,276,619 B2
(45) Date of Patent: Apr. 15, 2025

(54) SYSTEM FOR USE WITH COMPONENT OF POWER GENERATION APPARATUS

(71) Applicant: ROLLS-ROYCE plc, London (GB)

(72) Inventor: Andrew D Norton, Derby (GB)

(73) Assignee: ROLLS-ROYCE PLC, London (GB)

( * ) Notice: Subject to any disclaimer, the term of this patent is extended or adjusted under 35 U.S.C. 154(b) by 161 days.

(21) Appl. No.: 18/139,702

(22) Filed: Apr. 26, 2023

(65) Prior Publication Data
US 2023/0375483 A1 Nov. 23, 2023

(30) Foreign Application Priority Data

May 23, 2022 (GB) ..................................... 2207505

(51) Int. Cl.
*G01N 21/954* (2006.01)
*G02B 23/24* (2006.01)
(Continued)

(52) U.S. Cl.
CPC ....... *G01N 21/954* (2013.01); *G02B 23/2484* (2013.01); *H04N 23/555* (2023.01); *F01D 21/003* (2013.01)

(58) Field of Classification Search
CPC .... H04N 23/50; H04N 23/555; F01D 21/003; F01D 5/005; G02F 1/33; G02F 1/294; G01M 15/14; G02B 23/02; G02B 23/26; G02B 23/2492; G02B 23/2484; G02B 23/2476; G02B 23/2469; G02B 23/2461; G02B 23/2453; G02B 23/2446; G02B 23/2438; G02B 23/243; G02B 23/2423; G02B 23/2415; G02B 23/2407;
(Continued)

(56) References Cited

U.S. PATENT DOCUMENTS 5,017,796 A 5/1991 Makita
6,744,010 B1 6/2004 Pepe et al.
(Continued)

FOREIGN PATENT DOCUMENTS

GB 2 232 748 A 12/1990
GB 2 267 762 A 12/1993
(Continued)

OTHER PUBLICATIONS

Nov. 18, 2022 Combined Search and Examination Report issued in British Patent Application No. 2207505.5.
(Continued)

*Primary Examiner* — John R Lee
(74) *Attorney, Agent, or Firm* — Oliff PLC

(57) ABSTRACT

A system for use with a component of a power generation apparatus includes a lens arrangement disposed proximal to the component. The system further includes a variable focal length structure spaced apart from the lens arrangement and optically coupled with the lens arrangement. The variable focal length structure has a focal plane that is adjustable. The system further includes a controller communicably coupled with the variable focal length structure. The controller is configured to control the variable focal length structure to adjust the focal plane of the variable focal length structure, such that at least one region of interest of the component is in focus.

17 Claims, 6 Drawing Sheets

(51) Int. Cl.
*H04N 23/50* (2023.01)
*F01D 21/00* (2006.01)

(58) Field of Classification Search
CPC .............. G02B 23/24; G01N 21/954; G01N 2021/6548; G01N 2021/6546; G01N 2021/9544; G01N 2021/9542
See application file for complete search history.

(56) References Cited

U.S. PATENT DOCUMENTS

| | | | |
|---|---|---|---|
| 8,213,022 | B1 | 7/2012 | Riza et al. |
| 11,273,520 | B2 * | 3/2022 | Diwinsky .......... B23K 26/0648 |
| 11,724,335 | B2 * | 8/2023 | Diwinsky ............ B23K 26/032 |
| | | | 219/121.6 |
| 2004/0083738 | A1 | 5/2004 | McManus et al. |
| 2005/0085698 | A1 | 4/2005 | Bonningue et al. |
| 2008/0134684 | A1 | 6/2008 | Umeh et al. |
| 2012/0143004 | A1 | 6/2012 | Gupta et al. |
| 2012/0162192 | A1 | 6/2012 | Wang et al. |
| 2013/0063805 | A1 | 3/2013 | Arnold |
| 2013/0141782 | A1 | 6/2013 | Theriault et al. |
| 2016/0209636 | A1 | 7/2016 | Baleine et al. |
| 2016/0228991 | A1 | 8/2016 | Ryan et al. |
| 2017/0061601 | A1 | 3/2017 | Bryll |
| 2017/0318216 | A1 | 11/2017 | Gladnick et al. |
| 2017/0324895 | A1 | 11/2017 | Bryll et al. |
| 2018/0045934 | A1 | 2/2018 | Sugie et al. |
| 2018/0058233 | A1 | 3/2018 | Norton et al. |
| 2018/0088440 | A1 | 3/2018 | Gladnick et al. |
| 2018/0163561 | A1 | 6/2018 | Norton et al. |
| 2018/0275390 | A1 | 9/2018 | Harsila |
| 2019/0012777 | A1 | 1/2019 | Crannell et al. |
| 2019/0049392 | A1 | 2/2019 | Ruggiero |
| 2019/0054534 | A1 | 2/2019 | Norton et al. |
| 2019/0054535 | A1 | 2/2019 | Norton et al. |
| 2019/0075234 | A1 | 3/2019 | Freerksen et al. |
| 2019/0104302 | A1 | 4/2019 | Gladnick et al. |
| 2019/0145761 | A1 | 5/2019 | Ziegler et al. |
| 2019/0330997 | A1 | 10/2019 | Norton et al. |
| 2020/0038954 | A1 | 2/2020 | Regulin et al. |
| 2020/0246912 | A1 * | 8/2020 | Diwinsky .......... B23K 26/0622 |
| 2022/0107491 | A1 | 4/2022 | Brooks et al. |
| 2023/0375483 | A1 * | 11/2023 | Norton ................ B23K 26/032 |
| 2024/0180403 | A1 * | 6/2024 | Joshi .................. A61B 1/3132 |

FOREIGN PATENT DOCUMENTS

| | | |
|---|---|---|
| JP | 2002-258166 A | 9/2002 |
| WO | 2021/038453 A1 | 3/2021 |

OTHER PUBLICATIONS

Oct. 23, 2023 Extended European Search Report issued in European Patent Application No. 23169567.7.

\* cited by examiner

SYSTEM FOR USE WITH COMPONENT OF POWER GENERATION APPARATUS

FIELD OF THE DISCLOSURE

The present disclosure generally relates to a system for use with a component of a power generation apparatus.

BACKGROUND

A power generation apparatus, such as a gas turbine engine, may have to be periodically inspected in order to determine any damage or failure of one or more components of the power generation apparatus. Typically, an optical inspection system may be used to determine a current condition of the one or more components of the power generation apparatus. The optical inspection system may be deployed in a borescope port the power generation apparatus. The optical inspection system may be inserted into a gas path after a shutdown of the power generation apparatus and may be removed before the power generation apparatus is operated.

The optical inspection system may generate images for detecting the current condition of the components. Such images may allow determination of one or more defects and may also allow measurement of an extent of damage to the components. The optical inspection system may include, for example, a probe having a fixed optical structure. The fixed optical structure may define a fixed focal plane. In particular, an "in focus" position of the optical structure may be fixed. In such cases, if one or more features of interest of the components fall outside of the fixed focal plane, the said features of interest may be out of focus and may be difficult to optically interrogate, thereby reducing an accuracy of the optical inspection system.

In some examples, a laser repair system may be used to repair the defects in the components of the power generation apparatus. Conventionally, the components are repaired ex-situ. For example, the power generation apparatus may have to be disassembled to remove a particular component for repairing the defects in the component. The disassembly of the power generation apparatus may increase a downtime associated with the power generation apparatus and may also increase servicing costs, which may not be desirable.

SUMMARY

In a first aspect, there is provided a system for use with a component of a power generation apparatus. The system includes a lens arrangement disposed proximal to the component. The system further includes a variable focal length structure spaced apart from the lens arrangement and optically coupled with the lens arrangement. The variable focal length structure has a focal plane that is adjustable. The system further includes a controller communicably coupled with the variable focal length structure. The controller is configured to control the variable focal length structure to adjust the focal plane of the variable focal length structure, such that at least one region of interest of the component is in focus.

The system of the present disclosure may be associated with various power generation apparatus, such as, gas turbine engines, nuclear systems, propulsion systems, and the like. The system described herein may be embedded into the power generation apparatus. In another example, the system may be designed into a structure of the power generation apparatus. For example, the system may be integral with the power generation apparatus. In yet another example, the system may be inserted into the power generation apparatus when the power generation apparatus is in a cold condition.

The system described herein may be embodied as an optical inspection system or an optical laser repair system. The variable focal length structure of the system may be controlled to select a desired focal plane from a range of focal planes so that the region of interest of the component is in focus. Thus, the components of the power generation apparatus that may be disposed at different distances from the lens arrangement may be accurately inspected/repaired. The present disclosure may provide a robust and in-situ technique for inspection and/or repair of various components, which may improve an uptime of an asset such as a gas turbine engine. The system described herein may improve an accuracy with which the components are inspected and/or repaired. Further, the system may ensure that the at least one region of interest of the component is in focus without adjusting a position of the system or the component under inspection. Moreover, the system described herein provides a simple and cost effective technique to rapidly vary the focal plane so that the region of interest is always in focus.

In an example, the variable focal length structure may include an acoustically tunable lens. The variable focal length structure associated with the system may be capable of withstanding high-temperatures, may be insensitive to vibrations, and may allow variation in the focal planes on a microsecond scale. Specifically, the variable focal length structure may not require any redistribution of liquid to change its optical properties, thus, the variable focal length structure may scan over a range of focal lengths in microseconds. Further, the variable focal length structure may not present any spherical aberration.

In some embodiments, the system further includes an optical detection unit defining a first end and a second end opposite the first end. The optical detection unit is at least partially received or embedded within a bore defined by an asset such as a gas turbine engine, such that the first end is disposed proximal to the component. The lens arrangement is disposed proximal to the first end of the optical detection unit. Further, the variable focal length structure may be disposed proximal to the second end of the optical detection unit. Alternatively, the variable focal length structure may be disposed proximal to the first end of the optical detection unit. The optical detection unit described herein may be at least partially receivable within the bore of the power generation apparatus after shutdown for rapid component inspection and may be removed before the power generation apparatus starts operating, thereby providing a retrofittable optical inspection system. Alternatively, the optical detection unit may be embedded within the power generation apparatus.

In some embodiments, the optical detection unit further includes a probe housing extending from the first end towards the second end of the optical detection unit. The probe housing receives the lens arrangement therein. The probe housing may be at least partially received within the bore of the power generation apparatus so that the lens arrangement may be disposed proximal to the region of interest of the component.

In some embodiments, the optical detection unit further includes an optical element received within the probe housing adjacent to the lens arrangement, such that the optical element is optically coupled with the lens arrangement. The optical element is configured to redirect light from the component to the lens arrangement. When the optical detection unit is received within the bore, the optical element may be disposed proximal to the region of interest of the component. Further, the optical element may allow right-angled inspection of the components, for example, when the component may be disposed at any one side of the lens arrangement instead of being disposed in front of the lens arrangement. The optical element may include a prism or a mirror.

In some embodiments, the optical detection unit further includes a mount disposed adjacent to the probe housing. The mount couples the variable focal length structure on the probe housing. Specifically, the mount may hold and support the variable focal length structure therein.

In some embodiments, the probe housing is rigid. The rigid probe housing may include a robust design and may be made of materials that can withstand high temperatures.

In some embodiments, the probe housing is flexible. A position of such a flexible probe housing may be easy to adjust with respect to the component under inspection and may easily pass through complex sections of the power generation apparatus. Further, the probe housing may be made of materials that can withstand high temperatures.

In some embodiments, the system further includes an image sensor disposed proximal to the variable focal length structure, such that the variable focal length structure is disposed between the image sensor and the lens arrangement. The image sensor is configured to receive a component light from the variable focal length structure and generate an image of the at least one region of interest of the component based on the component light. The images generated by the image sensor may be used to determine the condition of the component, to identify one or more defects in the component, and/or to identify an extent of damage to the component.

In some embodiments, the image sensor is a camera. In an example, the camera may be disposed in a benign location. For example, the camera may be disposed outside of the bore of the power generation apparatus.

In some embodiments, the controller is further configured to receive the image generated by the image sensor. The controller is further configured to analyse the image generated by the image sensor to determine if the at least one region of interest is in focus. The controller is further configured to control the variable focal length structure to adjust the focal plane of the variable focal length structure upon determining that the at least one region of interest of the component is not in focus. Thus, the technique of determining whether the region of interest is in focus may be embodied as a passive autofocus system that uses the images generated by the image sensor to determine if the region of interest is in focus. The controller ensures that the region of interest of the component is in focus so that the component may be accurately inspected.

In some embodiments, the system further includes a light source configured to illuminate the at least one region of interest of the component. The illumination of the component may allow the image sensor to accurately capture the image of the component.

In some embodiments, the light source includes at least one of a pulsed light source and a continuous light source. In an example, when the light source is the continuous light source, the controller may remove or filter out the images at non-optimum focal planes and store the images that were captured at the desired focal plane. In another example, the light source may be synchronised with the variable focal length structure to illuminate the component when the region of interest is in focus, such that only the images that are illuminated may be stored for further processing and dark images may be discarded.

In some embodiments, the optical detection unit further includes an optical relay disposed between the variable focal length structure and the lens arrangement. The optical relay optically couples the lens arrangement with the variable focal length structure. When the system is embodied as the optical inspection system, the optical relay may transmit the component light from the lens arrangement to the variable focal length structure.

In some embodiments, the optical relay includes a plurality of optical fibres.

In some embodiments, the optical relay includes a plurality of relay lenses.

In some embodiments, the lens arrangement includes an objective lens.

In some embodiments, the system further includes a laser source configured to emit a laser beam. The laser source is disposed proximal to the variable focal length structure, such that the variable focal length structure is disposed between the laser source and the lens arrangement. The laser beam may be used to repair the defects in the component of the power generation apparatus. The variable focal length structure may be used to tune a focus of the system, such that the laser beam is accurately positioned on the defects to be repaired.

In a second aspect, there is provided a power generation apparatus including the system of the first aspect. The power generation apparatus includes a gas turbine engine.

Thus, the present disclosure may generally relate to systems that may allow generation of images or videos of one or more components of the power generation apparatus that are under inspection. The present disclosure may also relate to systems associated that may allow repair of one or more components of the power generation apparatus.

In a third aspect, there is provided a method comprising: controlling a system, having a focal plane that is adjustable, to adjust the focal plane such that at least one region of interest of a component of a power generation apparatus is in focus.

The system may be the system of the first aspect, or may be a different system whereby the focal plane is adjustable by physically moving the system relative to the component of the power generation apparatus. In some examples, the focal plane may be adjusted by moving a lens arrangement relative to the component of the power generation apparatus.

The skilled person will appreciate that except where mutually exclusive, a feature or parameter described in relation to any one of the above aspects may be applied to any other aspect. Furthermore, except where mutually exclusive, any feature or parameter described herein may be applied to any aspect and/or combined with any other feature or parameter described herein.

BRIEF DESCRIPTION

Embodiments will now be described by way of example only, with reference to the Figures, in which.

DETAILED DESCRIPTION

Aspects and embodiments of the present disclosure will now be discussed with reference to the accompanying Figures. Further aspects and embodiments will be apparent to those skilled in the art.

Figure 1:
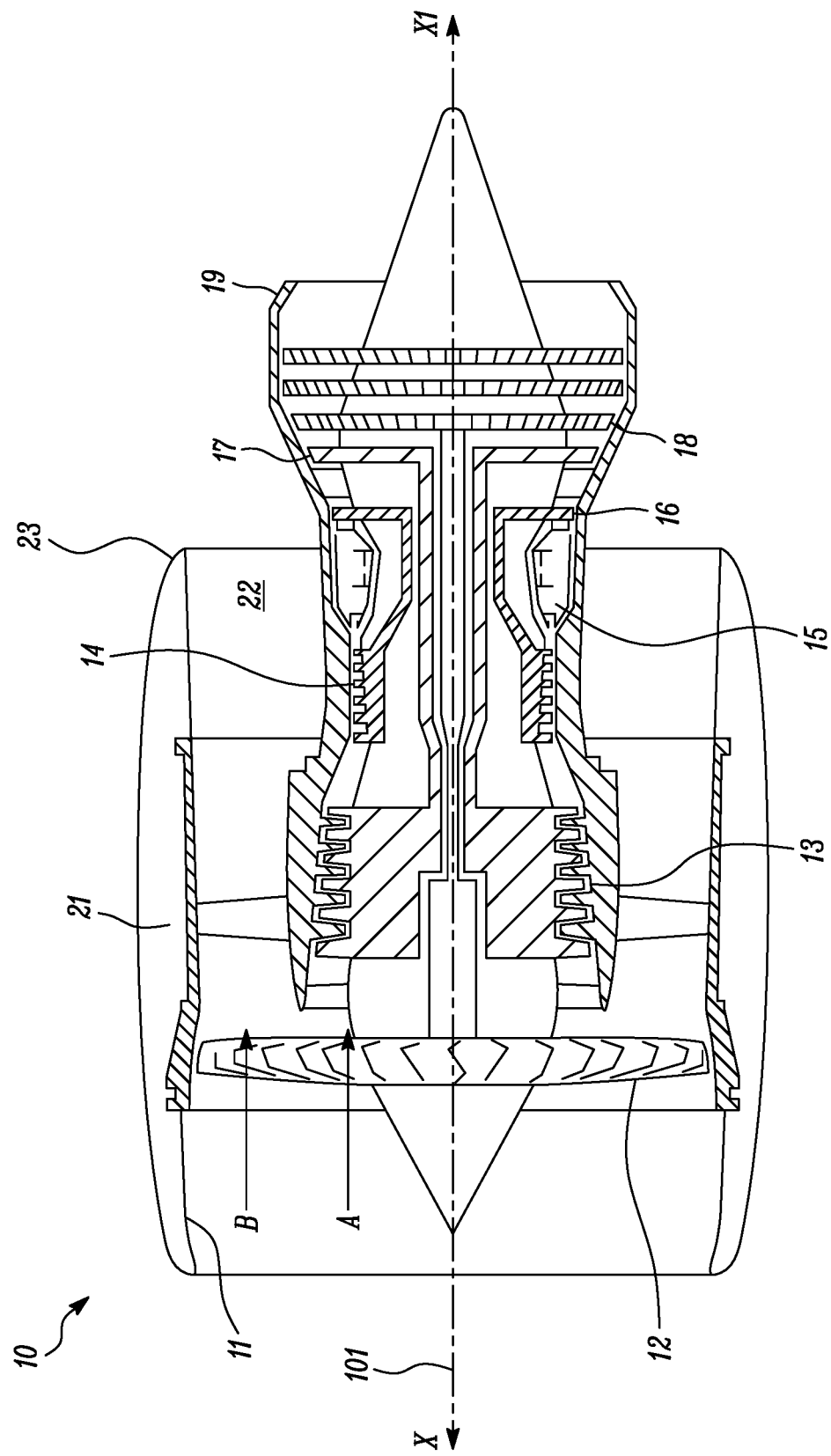
FIG. 1 is a schematic sectional side view of a power generation apparatus.

FIG. 1 shows an exemplary power generation apparatus 10. In the illustrated embodiment of FIG. 1, the power generation apparatus 10 includes a gas turbine engine. Alternatively, the power generation apparatus 10 may include a nuclear system, a steam turbine, a propulsion system, and the like. The power generation apparatus 10 may be interchangeably referred to as "the gas turbine engine 10". The gas turbine engine 10 has a principal rotational axis X-X1. The principal rotational axis X-X1 coincides with a longitudinal centre line 101 of the gas turbine engine 10.

In the following disclosure, the following definitions are adopted. The terms "upstream" and "downstream" are considered to be relative to an air flow through the gas turbine engine 10. The terms "axial" and "axially" are considered to relate to the direction of the principal rotational axis X-X1 of the gas turbine engine 10.

The gas turbine engine 10 includes, in axial flow series, an intake 11, a fan 12, an intermediate pressure compressor 13, a high-pressure compressor 14, a combustion equipment 15, a high-pressure turbine 16, an intermediate pressure turbine 17, a low-pressure turbine 18, and an engine core exhaust nozzle 19. A nacelle 21 generally surrounds the gas turbine engine 10 and defines the intake 11, a bypass duct 22, and a bypass exhaust nozzle 23.

During operation, air entering the intake 11 is accelerated by the fan 12 to produce two air flows: a first air flow A into the intermediate pressure compressor 13 and a second air flow B which passes through the bypass duct 22 to provide propulsive thrust. The intermediate pressure compressor 13 compresses the first air flow A directed into it before delivering that air to the high-pressure compressor 14 where further compression takes place.

The compressed air exhausted from the high-pressure compressor 14 is directed into the combustion equipment 15 where it is mixed with fuel and the mixture is combusted. The resultant hot combustion products then expand through, and thereby drive the high, intermediate, and low-pressure turbines 16, 17, 18 before being exhausted through the engine core exhaust nozzle 19 to provide additional propulsive thrust. The high, intermediate, and low-pressure turbines 16, 17, 18 respectively drive the high and intermediate pressure compressors 14, 13 and the fan 12 by suitable interconnecting shafts.

In some embodiments, the gas turbine engine 10 may be used in an aircraft (not shown). In some embodiments, the gas turbine engine 10 may be an ultra-high bypass ratio (UHBPR) engine. It should be noted that the gas turbine engine 10 may include any other application, without limiting the scope of the present disclosure.

Figure 2:
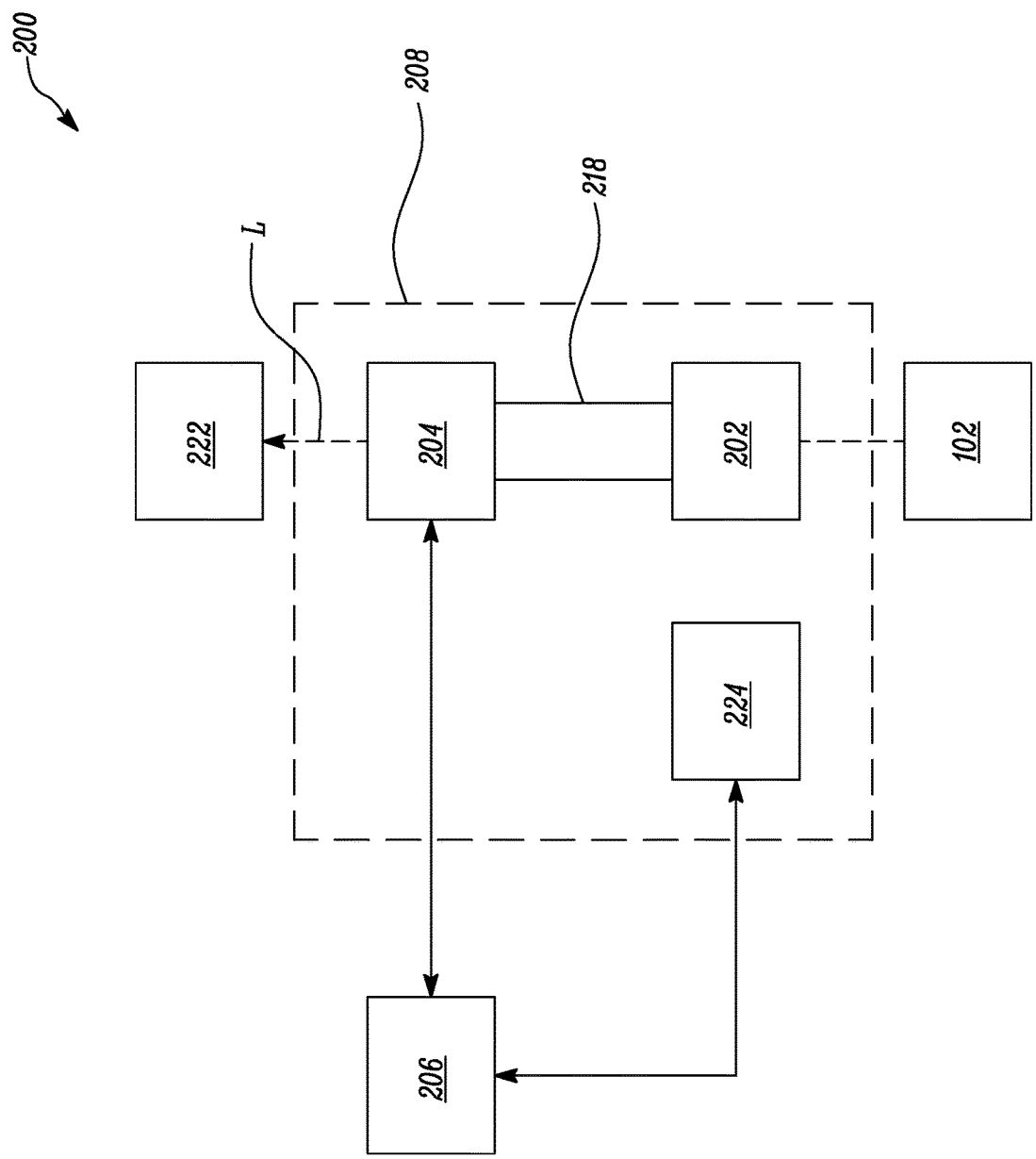
FIG. 2 is a block diagram of a system for use with a component of the power generation apparatus of FIG. 1 according to an embodiment of the present disclosure.

The power generation apparatus 10 includes a system 200 (shown in FIG. 2). Referring to FIG. 2, a schematic view of the system 200 for use with a component 102 of the power generation apparatus 10 (see FIG. 1) is illustrated. In the illustrated embodiment of FIG. 2, the system 200 is used for inspecting the component 102 of the gas turbine engine 10. For example, the system 200 may be used to visually inspect the component 102 in order to determine a condition of the component 102 and/or to determine one or more defects in the component 102. In an example, the system 200 may be embedded into the gas turbine engine 10. In such an example, the system 200 may remain within the gas turbine engine 100 during operation of the gas turbine engine 100. In another example, the system 200 may be designed into a structure of the gas turbine engine 10. For example, the system 200 may be integral with the gas turbine engine 10. In such an example, the system 200 may remain within the gas turbine engine 100 during operation during operation of the gas turbine engine 100. In yet another example, the system 200 may be inserted into the gas turbine engine 10 when the gas turbine engine 10 is in a cold condition. For example, the system 200 may be inserted between different instances of operation of the gas turbine engine 10.

The system 200 includes a lens arrangement 202 disposed proximal to the component 102. The system 200 further includes a variable focal length structure 204 spaced apart from the lens arrangement 202 and optically coupled with the lens arrangement 202. The variable focal length structure 204 has a focal plane F (see FIG. 3) that is adjustable. Further, the system 200 includes a controller 206 communicably coupled with the variable focal length structure 204.

The controller 206 may include one or more memories and one or more processors communicably coupled with the one or more memories. The one or more processors may be any device that performs logic operations. The one or more processors may embody a single microprocessor or multiple microprocessors for receiving various input signals. Numerous commercially available microprocessors may be configured to perform the functions of the one or more processors. The one or more processors may include an application specific integrated circuit (ASIC), a digital signal processor, a field programmable gate array (FPGA), a digital circuit, an analog circuit, and/or any other type of processor, or any combination thereof. The one or more processors may include one or more components that may be operable to execute computer executable instructions or computer code that may be stored and retrieved from the one or more memories.

The controller 206 is configured to control the variable focal length structure 204 to adjust the focal plane F of the variable focal length structure 204, such that at least one region of interest 106 (see FIG. 3) of the component 102 is in focus. The at least one region of interest 106 may be interchangeably referred to herein as "the region of interest 106".

Figure 3:
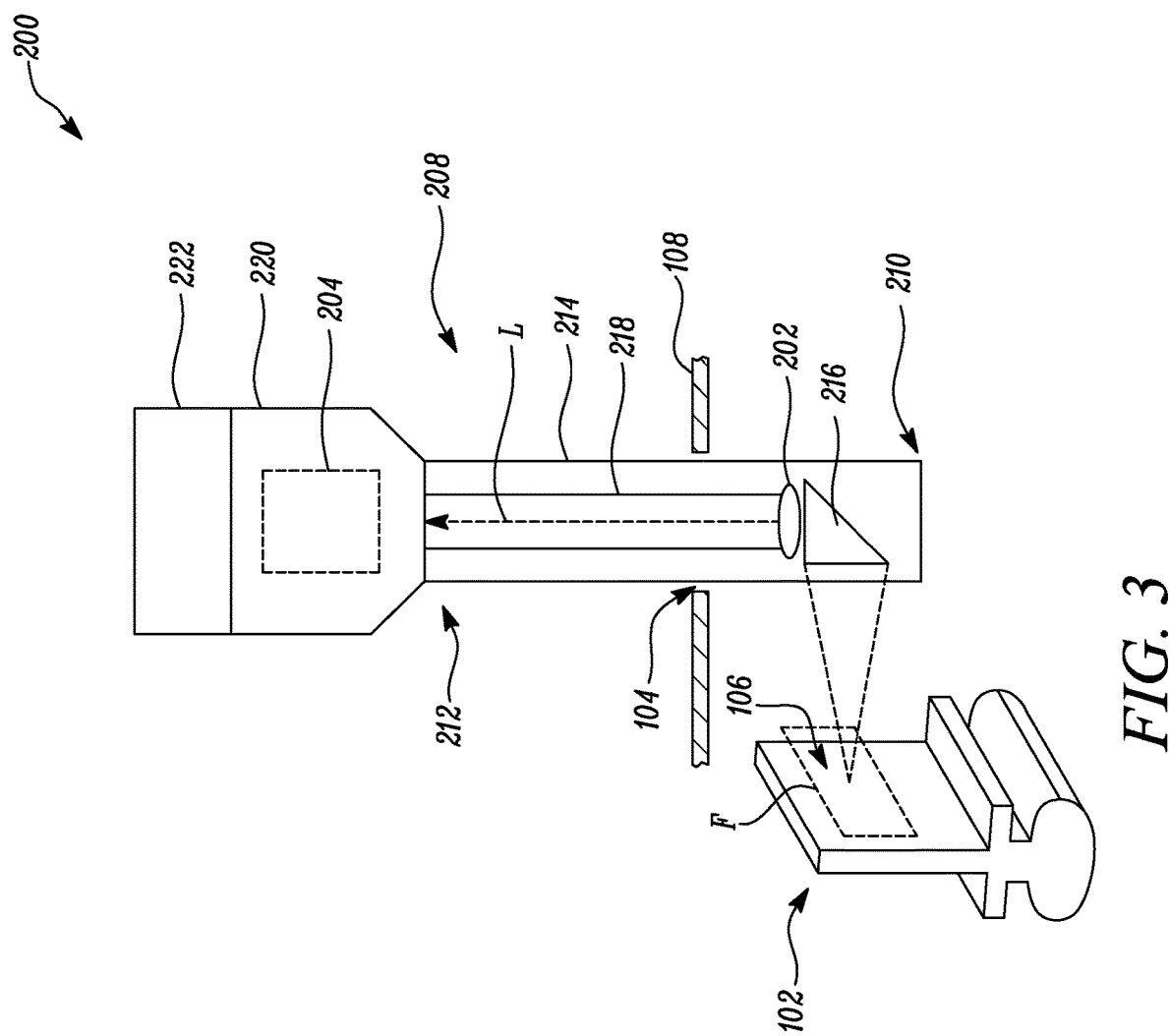
FIG. 3 is a schematic view illustrating the component and the system of FIG. 2 according to an embodiment of the present disclosure.

Referring to FIG. 3, a portion of the system 200 may be receivable within a bore 104 defined by the gas turbine engine 10 (see FIG. 1). In an example, a part 108 of the gas turbine engine 10, such as a casing or a housing, may define the bore 104. It should be noted that the bore 104 may be embodied as a port, an aperture, a hole, or any other access point in the gas turbine engine 10. Further, in the illustrated embodiment of FIG. 3, the component 102 is a blade that may be associated with the compressor 13, 14 (see FIG. 1) or the turbine 16, 17, 18 (see FIG. 1) of the gas turbine engine 10. However, the component 102 may include any other component/part of the gas turbine engine 10. Further, the system 200 may also be used to inspect/repair components or parts disposed in confined spaces or in machineries that may not be feasible to disassemble for minor inspection/repair purposes.

In some embodiments, the system 200 includes an optical detection unit 208 defining a first end 210 and a second end 212 opposite the first end 210. The optical detection unit 208 may be at least partially received or embedded within the bore 104 defined by the gas turbine engine 10, such that the first end 210 may be disposed proximal to the component 102. In an example, the optical detection unit 208 may be partially inserted into the bore 104 when the gas turbine engine 10 is not operating and the optical detection unit 208 may be removed before the gas turbine engine 10 starts operating, thereby providing a retrofittable optical inspection system. Alternatively, the optical detection unit 208 may be embedded within the bore 104 of the gas turbine engine 10. The optical detection unit 208 may be designed to have a fixed optical structure, which may be constructed from high-temperature capability materials.

In some embodiments, the lens arrangement 202 is disposed proximal to the first end 210 of the optical detection unit 208. The lens arrangement 202 may form a part of the optical detection unit 208. The lens arrangement 202 may be disposed proximal to the component 102. The lens arrangement 202 may receive a component light L from the component 102 during the inspection of the component 102. The component light L may be interchangeably referred to as "the light L". Further, the lens arrangement 202 may transmit the component light L along an optical path that passes through the variable focal length structure 204. In some embodiments, the lens arrangement 202 includes an objective lens. In some examples, the objective lens may be selected from a set of fixed magnification objective lenses (e.g., a set ranging from 0.5× to 100×, etc.).

In some embodiments, the optical detection unit 208 further includes a probe housing 214 extending from the first end 210 towards the second end 212 of the optical detection unit 208. The probe housing 214 may receive the lens arrangement 202 therein. In some examples, the probe housing 214 may be received within bore 104 of the gas turbine engine 10, such that the lens arrangement 202 may be disposed proximal to the region of interest 106 of the component 102.

In some embodiments, the probe housing 214 is rigid. The rigid probe housing 214 may include a robust design. The probe housing 214 may be made from a material that can withstand high temperatures, specifically in examples wherein the optical detection unit 208 is embedded within the bore 104. In some embodiments, the optical detection unit 208 further includes an optical element 216 received within the probe housing 214 adjacent to the lens arrangement 202, such that the optical element 216 is optically coupled with the lens arrangement 202. The optical element 216 is configured to redirect the light L from the component 102 to the lens arrangement 202. When the optical detection unit 208 is partially received within the bore 104, the optical element 216 may be disposed proximal to the region of interest 106 of the component 102. Further, the optical element 216 may allow right-angled inspection of the component 102, for example, when the component 102 may be disposed at any one side of the lens arrangement 202 instead of being disposed in front of the lens arrangement 202. In the illustrated embodiment of FIG. 3, the optical element 216 includes a prism. It should be noted that a capability of the prism is not restricted to only inspect components that are disposed perpendicular to the probe housing 214. Thus, in various examples, the prism may be angled in different ways, based on a position of the components. It may also be contemplated that an angle of the prism may be adjusted to vary a view of the component 102 during the inspection process, for example, the prism may include a swing prism. Alternatively, the optical element 216 may include a mirror or any other device/mechanism that allows inspection of components disposed along a length of the probe housing 214. In some examples, the optical detection unit 208 may omit the optical element 216, for example, to inspect components that are disposed in front of the lens arrangement 202.

In some embodiments, an optical relay 218 is disposed between the variable focal length structure 204 and the lens arrangement 202. The optical relay 218 may be supported within the probe housing 214. The optical relay 218 optically couples the lens arrangement 202 with the variable focal length structure 204. The optical relay 218 may transmit the component light L from the lens arrangement 202 to the variable focal length structure 204. The optical relay 218 may include a plurality of optical fibres. Alternatively, the optical relay 218 may include a plurality of relay lenses. In an example, the optical relay 218 may include a series of Hopkins-lens based optical components.

Further, in some embodiments, the optical detection unit 208 includes a mount 220 disposed adjacent to the probe housing 214. The mount 220 couples the variable focal length structure 204 on the probe housing 214. In other words, the mount 220 may receive and hold the variable focal length structure 204. The mount 220 may be disposed proximal to the second end 212 of the optical detection unit 208. It should be noted that a design and an arrangement of the optical detection unit 208 as described herein is exemplary in nature, and the optical detection unit 208 may include any other design or arrangement for performing the intended function.

In some embodiments, the system 200 further includes an image sensor 222 disposed proximal to the variable focal length structure 204, such that the variable focal length structure 204 is disposed between the image sensor 222 and the lens arrangement 202. The image sensor 222 may be configured to receive the component light L from the variable focal length structure 204 and generate an image of the at least one region of interest 106 of the component 102 based on the component light L. The images generated by the image sensor 222 may be used to determine the condition of the component 102, to identify the defects in the component 102, and/or to identify an extent of damage to the component 102. In some examples, the image sensor 222 may also generate videos of the component 102.

The image sensor 222 may be communicably coupled with the controller 206. In some embodiments, the image sensor 222 is a camera. Further, the image sensor 222 may be disposed adjacent to the mount 220 that supports the variable focal length structure 204. In other examples, the image sensor 222 may be distal from the mount 220. In an example, the camera may be disposed in a benign location. For example, the image sensor 222 and the mount 220 may be disposed outside the bore 104. Further, it may be contemplated that the image sensor 222 may be disposed outside the bore 104 and the mount 220 containing the variable focal length structure 204 may be disposed within the bore 104.

In some embodiments, the system 200 further includes a light source 224 (see FIG. 2) configured to illuminate the at least one region of interest 106 of the component 102. The light source 224 may emit a source light to illuminate the component 102. The source light may be reflected or transmitted as the component light L. The component light L may be received by the lens arrangement 202 and the lens arrangement 202 may further output the component light L to the optical relay 218. Further, the component light L may pass through the variable focal length structure 204 and may be ultimately gathered by the image sensor 222 for generating the image of the component 102.

In various examples, the light source 224 may be communicably coupled to the controller 206 (see FIG. 2) through signal lines or busses. The light source 224 may include at least one of a pulsed light source and a continuous light source. In an example, the pulsed light source may be capable of illuminating the component 102 and may be synchronously pulsed with an operating frequency of the variable focal length structure 204. In an example, the light source 224 may include a shutter (not shown) that may be communicably coupled to the controller 206 for receiving the signal to time the emission of the source light from the light source 224. Further, the light source 224 may include a stage light source, a coaxial light source, or a ring light source that may emit the source light to illuminate the component 102.

In the illustrated embodiment of FIG. 3, the variable focal length structure 204 is disposed proximal to the second end 212 of the optical detection unit 208. In other embodiments, the variable focal length structure 204 may be disposed proximate to the first end 210 of the optical detection unit 208. As mentioned above, the focal plane F of the variable focal length structure 204 may be varied so that the region of interest 106 of the component 102 is in focus. More particularly, a front-focal plane ahead of the lens arrangement 202 may change, while a back-focus plane on the image sensor 222 may be constant. As a result, the focal plane F in front of the variable focal length structure 204 may be rapidly varied to ensure that the component 102 being inspected is always in focus. The variable focal length structure 204 may be capable to withstand high-temperatures, may be insensitive to vibrations, and may be capable of changing the focal plane F on a microsecond scale.

Figure 4:
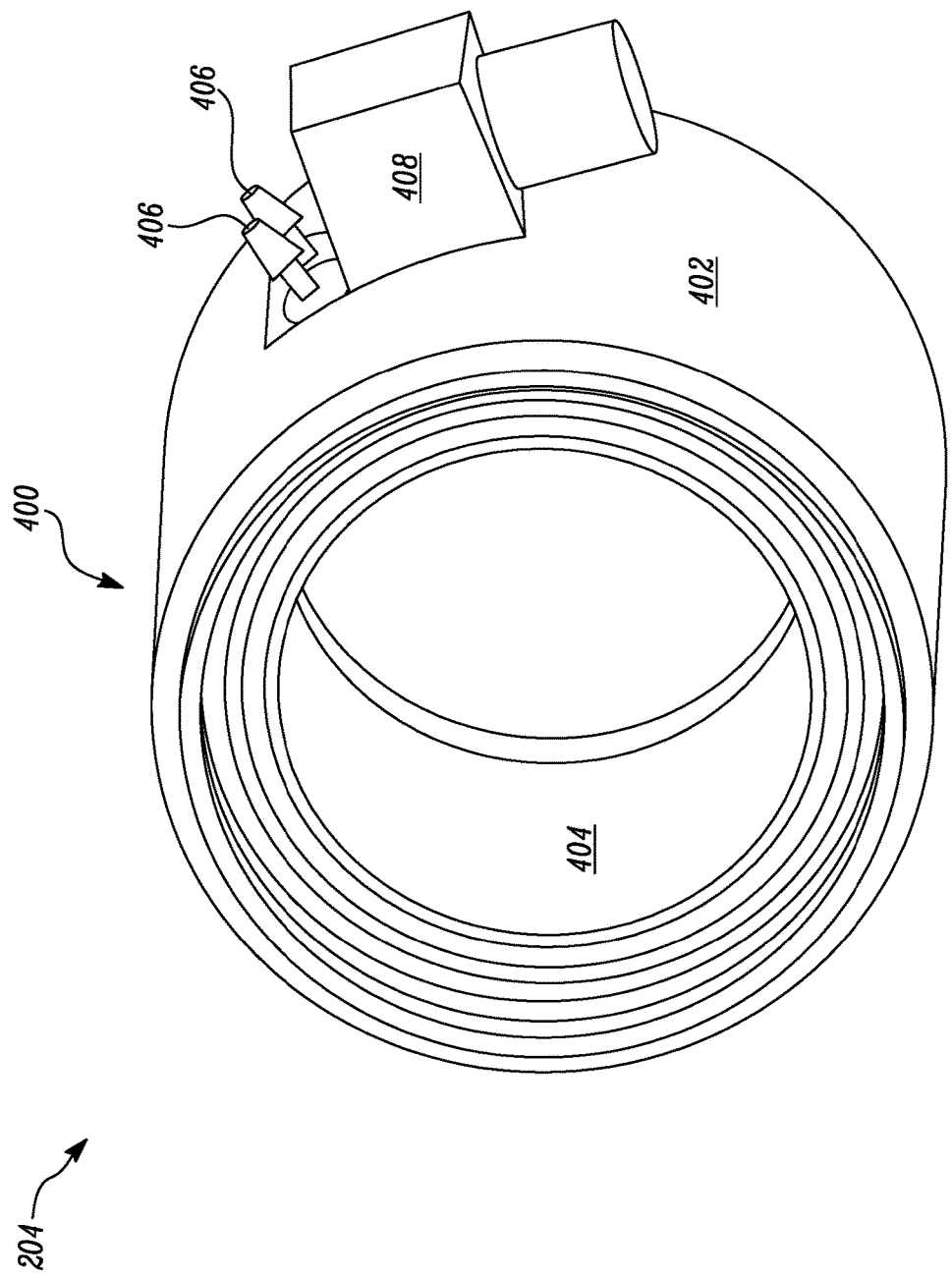
FIG. 4 illustrates a schematic perspective view of an acoustically tunable lens associated with the system of FIG. 2 according to an embodiment of the present disclosure.

Referring to FIG. 4, in an example, the variable focal length structure 204 may include an acoustically tunable lens 400. In some examples, the acoustically tunable lens 400 may include a tunable acoustic gradient index of refraction lens (TAGLens™) manufactured by Mitutoyo Corporation. In other embodiments, the variable focal length structure 204 may include any other device or combination of devices that may allow variation of the focal plane F.

The acoustically tunable lens 400 may embody a piezoelectrically driven device that uses acoustic waves to modulate the wavefront of a light ray. In an example, the acoustically tunable lens 400 may include an inner casing (not shown) and an outer casing 402 that may be concentric with the inner casing. Further, the acoustically tunable lens 400 may include a piezoelectric element 404 disposed within the inner casing. The piezoelectric element 404 may be constrained by two transparent windows (not shown) on either ends for optical access. In the illustrated embodiment of FIG. 4, the outer casing 402 and the piezoelectric element 404 is cylindrical in shape. Alternatively, the outer casing 402 and the piezoelectric element 404 may have any other shape. The piezoelectric element 404 may be filled with a refractive fluid. In another example, the refractive fluid may be replaced by a refractive material that may include a gas, solid, plasma, or an optical gain medium. The piezoelectric element 404 may deliver an acoustic wave to alter a refractive index of the refractive material. Based on a variation of the refractive index, the focal plane F (see FIG. 3) of the acoustically tunable lens 400 may be varied. The acoustic wave may be created by applying an alternating voltage, typically in the radio-frequency range, by the controller 206 (see FIG. 2).

Further, the acoustically tunable lens 400 may include one or more outlet/inlet ports 406 that may facilitate an introduction or removal of the refractive fluid from the acoustically tunable lens 400. For example, the inner casing and the outer casing 402 may be formed so as to allow the refractive fluid to be introduced within the piezoelectric element 404. Additionally, one or more electrical feedthrough ports (not shown) may be provided in the inner casing and the outer casing 402 to establish an electrical connection with the piezoelectric element 404. In an example, wires may extend through the electrical feedthrough ports to provide the electrical connection with the piezoelectric element 404. The electrical feedthrough ports may be in communication with a connector 408. The acoustically tunable lens 400 may not require any redistribution of liquid to change its optical properties and thus the acoustically tunable lens 400 may scan over a range of focal lengths in microseconds. Further, the acoustically tunable lens 400 may not present any spherical aberration.

It should be noted that the details related to the acoustically tunable lens 400 as mentioned herein are exemplary in nature. The present disclosure is not limited by a construction/design of the acoustically tunable lens 400.

In some alternative embodiments, the variable focal length structure 204 may include multiple lenses (not shown) that may be movable relative to each other to adjust a focal length of the variable focal length structure 204.

Referring again to FIG. 2, the controller 206 may be configured to transmit a signal to control the refractive index of refraction of the variable focal length structure 204 so that the region of interest 106 (see FIG. 3) is in focus. Further, the controller 206 may determine if the region of interest 106 is in focus. For this purpose, the controller 206 may be configured to receive the image generated by the image sensor 222. The controller 206 may be further configured to analyse the image generated by the image sensor 222 to determine if the at least one region of interest 106 is in focus. Further, the controller 206 may be configured to control the variable focal length structure 204 to adjust the focal plane F (see FIG. 3) of the variable focal length structure 204 upon determining that the at least one region of interest 106 of the component 102 is not in focus.

In some examples, the controller 206 may utilise one or more focus quality metrics to determine if the region of interest 106 is in focus. The technique of determining whether the region of interest 106 is in focus may be embodied as a passive autofocus system that uses the images generated by the image sensor 222 to determine if the region of interest 106 is in focus. In some examples, a number of mathematical approaches, such as, Gaussian filters, Laplacian, power squared, etc., may be used to determine whether the region of interest 106 is in focus. A closed-loop logic cycle as described herein may occur on the microsecond scale, which may ensure that the region of interest 106 of the component 102 is always in focus. Further, once the images in focus are captured, suitable feature detection and measurement algorithms may be executed by the controller 206 to determine a size and/or a location of the defects in the component 102. The system 200 described herein may provide a simple and cost effective technique that may allow rapid variation of the focal plane F so that the region of interest 106 is in focus.

In some examples, the controller 206 may store the images captured at the focal plane F in which the region of interest 106 is in focus. Further, the images from other focal planes may be filtered out or deleted, as per application requirements. In an example, when the light source 224 is the continuous light source, the variable focal length structure 204 may scan through all available focal planes and the controller 206 may remove or filter out images at the non-optimum focal planes.

Further, when the light source 224 is the pulsed light source, the controller 206 may control the light source 224 so that the component 102 is illuminated only when the region of interest 106 is in focus. Specifically, the controller 206 may be configured to provide a synchronizing signal to time the light source 224 based on the signal transmitted to the variable focal length structure 204. Thus, the light source 224 may illuminate the component 102 when a desired refractive index is present within the variable focal length structure 204. In such examples, the images that are illuminated may be stored for further processing and dark images may be discarded by the controller 206. The illuminated images may be indicative of the images wherein the region of interest 106 is in focus.

Figure 5:
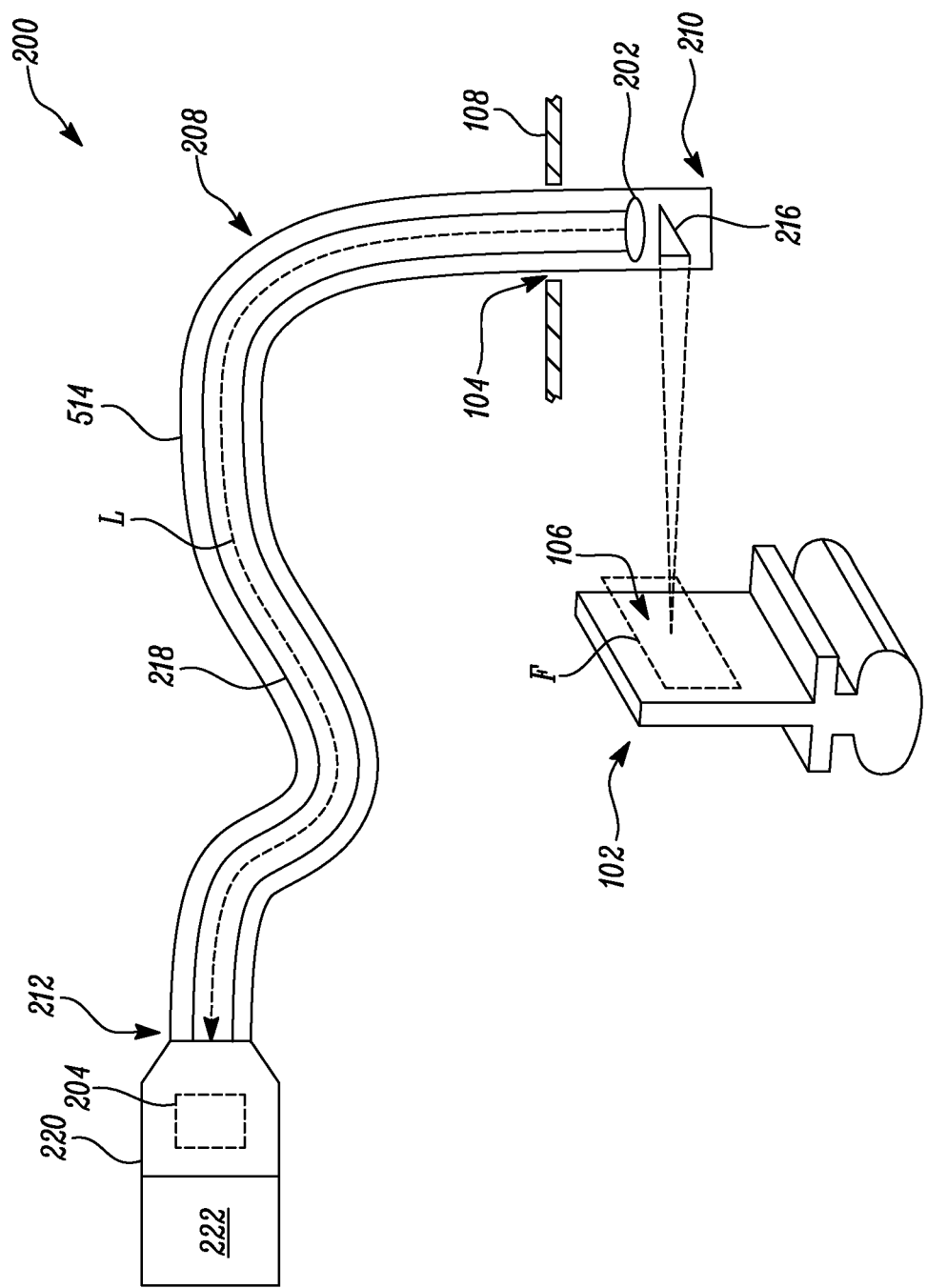
FIG. 5 illustrates a schematic view of a flexible probe housing associated with the system of FIG. 2 according to another embodiment of the present disclosure.

FIG. 5 illustrates another design of a probe housing 514 associated with the system 200, in accordance with another embodiment of the present disclosure. In the illustrated embodiment of FIG. 5, the optical detection unit 208 includes the probe housing 514 extending from the first end 210 towards the second end 212 of the optical detection unit 208. The probe housing 514 may receive the lens arrangement 202 therein. In some embodiments, the probe housing 514 is flexible. Specifically, the probe housing 514 may be made from a flexible material. A position of the flexible probe housing 514 may be easy to adjust with respect to the component 102 under inspection and may easily pass through complex sections of the gas turbine engine 10 (see FIG. 1). The probe housing 514 may be made from a material that can withstand high temperatures, specifically in examples wherein the optical detection unit 208 is embedded within the bore 104.

Figure 6:
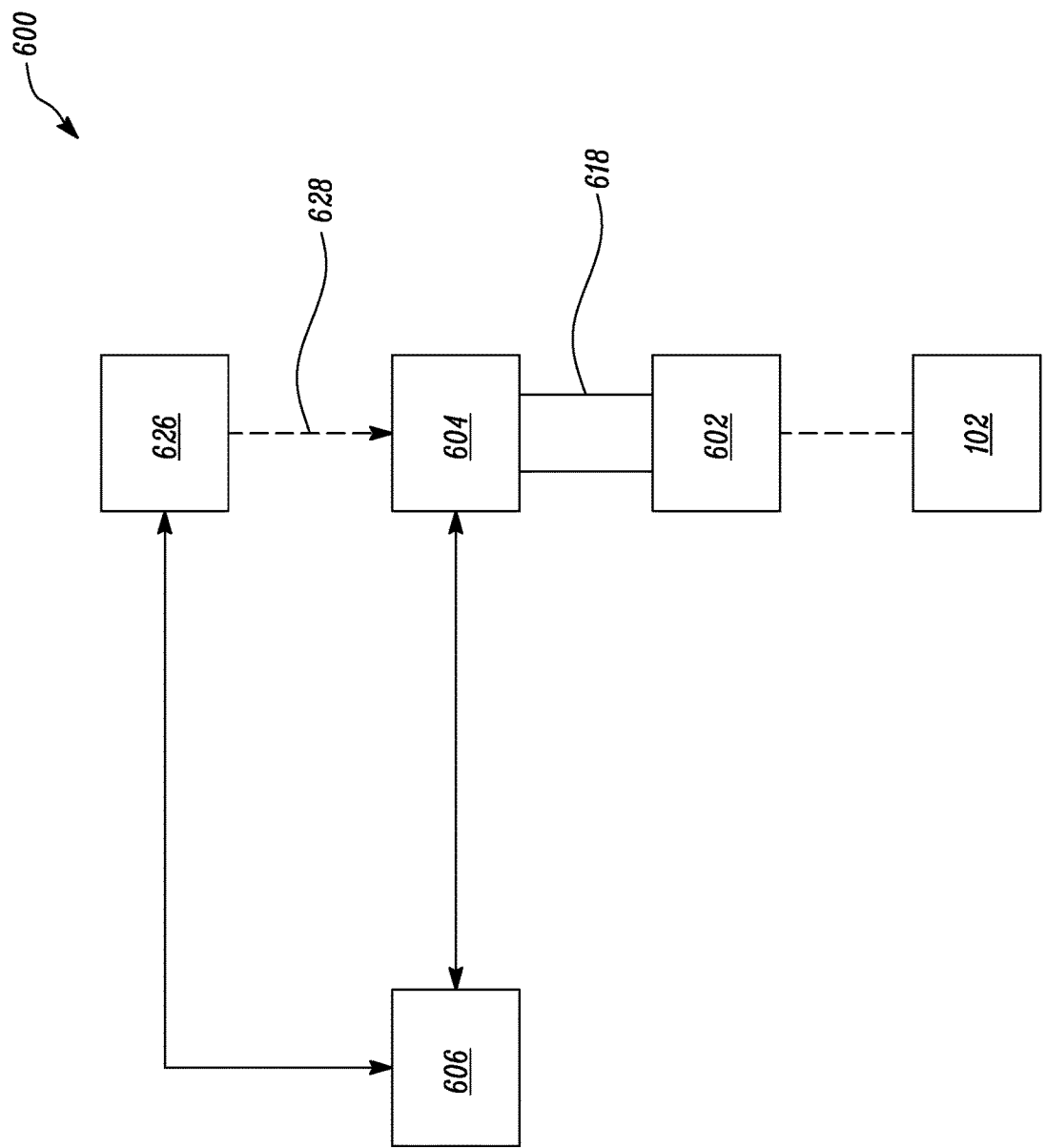
FIG. 6 is a block diagram of a system for use with the component of the power generation apparatus of FIG. 1 according to yet another embodiment of the present disclosure.

FIG. 6 illustrates a schematic view of a system 600 for use with the component 102 of the gas turbine engine 10 (see FIG. 1). The system 600 may be used for repairing the component 102 of the gas turbine engine 10. For example, the system 600 may be used to repair the defects in the component 102. A portion of the system 600 may be receivable within the bore 104 (see FIG. 3) defined by the gas turbine engine 10.

The system 600 includes a lens arrangement 602 disposed proximal to the component 102. The lens arrangement 602 may be similar to the lens arrangement 202 explained in relation to FIGS. 2 and 3. The lens arrangement 602 includes an objective lens. The lens arrangement 602 may be supported by a suitable housing (not shown). The housing may be similar to one of the probe housings 214, 514 as described with reference to FIGS. 3 and 5, respectively. When the housing is received within the bore 104, the lens arrangement 602 may be disposed proximal to the component 102. In an example, the housing may be partially inserted into the bore 104 when the gas turbine engine 10 is not operating and the housing may be removed before the gas turbine engine 10 starts operating. Alternatively, the housing may be embedded within the gas turbine engine 10. In an example, the housing may be designed to have a fixed optical structure, that may be constructed from high-temperature capability materials.

The system 600 further includes a variable focal length structure 604 spaced apart from the lens arrangement 602 and optically coupled with the lens arrangement 602. The variable focal length structure 604 has a focal plane (similar to the focal plane F shown in FIG. 3) that is adjustable. Further, the system 600 also includes a controller 606 communicably coupled with the variable focal length structure 604. The controller 606 is configured to control the variable focal length structure 604 to adjust the focal plane of the variable focal length structure 604, such that the at least one region of interest 106 (see FIG. 3) of the component 102 is in focus.

The variable focal length structure 604 is substantially similar to the variable focal length structure 204 described in reference to FIGS. 2, 3, and 4. It should be noted that the details provided for the variable focal length structure 204 may be equally applicable to the variable focal length structure 604. The focal plane of the variable focal length structure 604 may be varied so that the region of interest 106 of the component 102 is in focus. In some examples, the variable focal length structure 604 may correct the focal plane such that the region of interest 106 under repair is in focus. The variable focal length structure 604 may allow the focal plane in front of the variable focal length structure 604 to be rapidly varied to ensure that the defects being repaired are always in focus. In some embodiments, the variable focal length structure 604 includes the acoustically tunable lens 400 as illustrated and described in detail with reference to FIG. 4.

Further, a mount (not shown) may couple the variable focal length structure 604 on the housing. In other words, the mount may receive and hold the variable focal length structure 604. In some examples, the mount may be disposed at an end of the housing that is distal from an end at which the lens arrangement 602 is disposed.

Further, in some embodiments, the system 600 includes a laser source 626 configured to emit a laser beam 628. The laser source 626 may be disposed proximal to the variable focal length structure 604, such that the variable focal length structure 604 may be disposed between the laser source 626 and the lens arrangement 602. The laser source 626 may embody a nanosecond, picosecond, or femtosecond pulsed source of laser. Further, the variable focal length structure 604 may be used to tune a focus of the system 600, such that the laser beam 626 is accurately positioned on the defects to be repaired.

In some embodiments, an optical relay 618 is disposed between the variable focal length structure 604 and the lens arrangement 602. The optical relay 618 may be similar to the optical relay 218 explained in relation to FIGS. 2 and 3. The optical relay 618 may be supported within the housing. The optical relay 618 optically couples the lens arrangement 602 with the variable focal length structure 604. The optical relay 618 may guide the laser beam 628 from the laser source 626 such that the laser beam 628 is incident upon the lens arrangement 602. During the repair of the component 102, the lens arrangement 602 may compress the laser beam 628 such that the laser beam 628 incident to the lens arrangement 602 through the optical relay 618 lens may be focused on the component 102 to repair the defects in the component 102.

The optical relay 618 may include a plurality of optical fibres. Alternatively, the optical relay 618 may include a plurality of relay lenses. In an example, the optical relay 618 may include a series of Hopkins-lens based optical components. It should be noted that the system 600 may additionally include other devices (not shown herein), such as a scan module, that may adjust and guide the laser beam 628 onto the component 102. The system 600 described herein may provide a simple and cost effective technique that may allow rapid variation of the focal plane so that the light beam 628 may be accurately positioned on the defects to be repaired.

The system 600 may optionally include a review system (not shown) that may be used to view the ongoing repair process of the component 102. The review system may include an image sensor and a light source. The image sensor may be disposed proximal to the variable focal length structure 604, such that the variable focal length structure 604 may be disposed between the image sensor and the lens arrangement 602. The image sensor of the system 600 may be substantially similar to the image sensor 222 of the system 200 illustrated and described with reference to FIGS. 2 and 3. Further, details related to the functioning of the image sensor 222 may be applicable to the image sensor of the system 600. The light source may be configured to illuminate the region of interest 106 of the component 102 that is being repaired. The light source may include at least one of a pulsed light source and a continuous light source. The light source of the system 600 may be substantially similar to the light source 224 of the system 200 illustrated and described with reference to FIGS. 2 and 3. Further, details related to the functioning of the light source 224 may be applicable to the light source of the system 600.

Referring now to FIGS. 2 and 6, the variable focal length structures 204, 604 of the systems 200, 600, respectively, may be controlled to select a desired focal plane from a range of focal planes so that the region of interest 106 of the component 102 is in focus. Thus, the components of the gas turbine engine 10 (see FIG. 1) that may be disposed at different distances from the lens arrangements 202, 602 may be accurately inspected/repaired. The present disclosure may provide a robust and in-situ technique for inspection and/or repair of various components, which may improve an uptime of the gas turbine engine 10. The systems 200, 600 described herein may improve an accuracy with which the components are inspected and repaired.

It will be understood that the invention is not limited to the embodiments above described and various modifications and improvements can be made without departing from the concepts described herein. Except where mutually exclusive, any of the features may be employed separately or in combination with any other features and the disclosure extends to and includes all combinations and sub-combinations of one or more features described herein.

I claim:

1. A system for use with a component of a power generation apparatus, the system comprising:
   an optical detection unit at least partially received or embedded within a bore of the power generation apparatus such that a first end of the optical detection unit is disposed proximal to the component;
   a lens arrangement disposed proximal to the component and proximal to the first end of the optical detection unit;
   a variable focal length structure spaced apart from the lens arrangement and optically coupled with the lens arrangement, the variable focal length structure having a focal plane that is adjustable; and
   a controller communicably coupled with the variable focal length structure and being configured to control the variable focal length structure to adjust the focal plane of the variable focal length structure such that at least one region of interest of the component is in focus,
   wherein the optical detection unit further comprises:
   a probe housing receiving the lens arrangement therein and extending from the first end of the optical detection unit toward a second end of the optical detection unit opposite the first end; and
   a mount disposed adjacent to the probe housing and proximal to the second end of the optical detection unit, the mount coupling the variable focal length structure on the probe housing.

2. The system according to claim 1,
wherein the optical detection unit further comprises an optical element received within the probe housing adjacent to the lens arrangement, such that the optical element is optically coupled with the lens arrangement, and
wherein the optical element is configured to redirect light from the component to the lens arrangement.

3. The system according to claim 1, wherein the probe housing is rigid.

4. The system according to claim 1, wherein the probe housing is flexible.

5. The system according to claim 1, further comprising an image sensor disposed proximal to the variable focal length structure, such that the variable focal length structure is disposed between the image sensor and the lens arrangement,
wherein the image sensor is configured to receive a component light from the variable focal length structure and generate an image of the at least one region of interest of the component based on the component light.

6. The system according to claim 5, wherein the image sensor is a camera.

7. The system according to claim 5, wherein the controller is further configured to:
receive the image generated by the image sensor;
analyse the image generated by the image sensor to determine if the at least one region of interest is in focus; and
control the variable focal length structure to adjust the focal plane of the variable focal length structure upon determining that the at least one region of interest of the component is not in focus.

8. The system according to claim 1, further comprising a light source configured to illuminate the at least one region of interest of the component.

9. The system according to claim 8, wherein the light source comprises at least one of a pulsed light source and a continuous light source.

10. The system according to claim 1, further comprising an optical relay disposed between the variable focal length structure and the lens arrangement,
wherein the optical relay optically couples the lens arrangement with the variable focal length structure.

11. The system according to claim 10, wherein the optical relay comprises a plurality of optical fibres.

12. The system according to claim 10, wherein the optical relay comprises a plurality of relay lenses.

13. The system according to claim 1, wherein the lens arrangement comprises an objective lens.

14. The system according to claim 1, further comprising a laser source configured to emit a laser beam,
wherein the laser source is disposed proximal to the variable focal length structure, such that the variable focal length structure is disposed between the laser source and the lens arrangement.

15. A power generation apparatus comprising the system according to claim 1, wherein the power generation apparatus comprises a gas turbine engine.

16. The system according to claim 5, wherein the image sensor and the mount are disposed outside the bore defined by the power generation apparatus.

17. The system according to claim 5, wherein
the image sensor is disposed outside the bore of the power generation apparatus, and
the mount to which is coupled the variable focal length structure is disposed within the bore.

* * * * *